S. Pearn,
Ship Pump,
No. 13,622.    Patented Oct. 2, 1855.
Fig. 1.
Fig. 2.
Fig. 3.
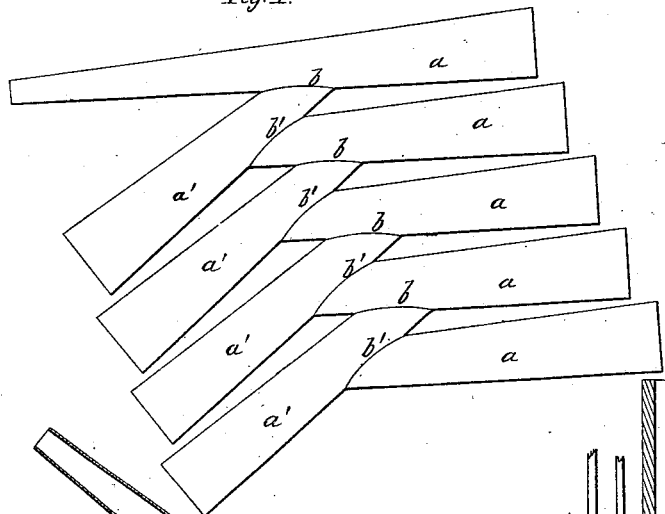
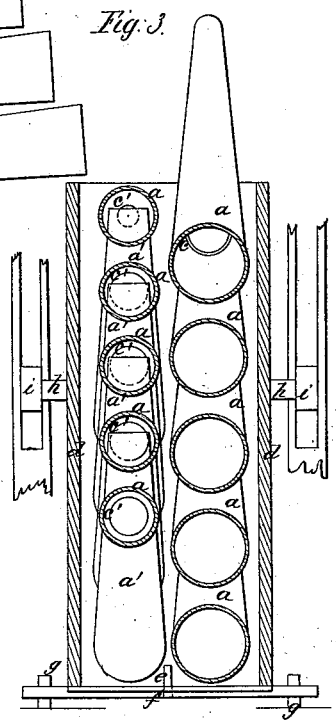
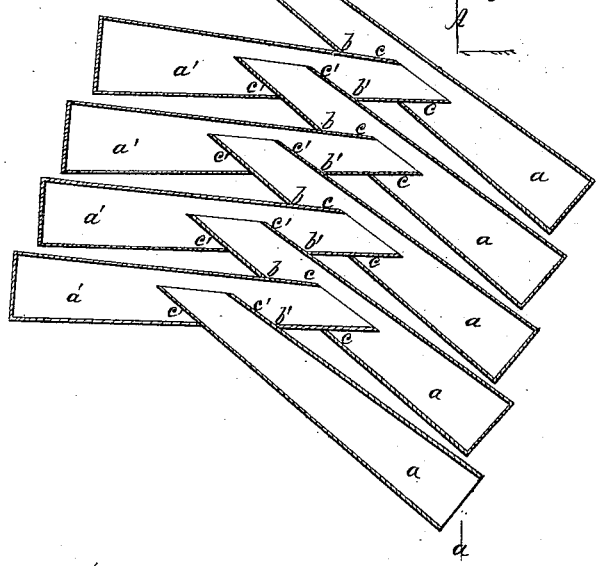
Witnesses;
Inventor;
Samuel Pearn

UNITED STATES PATENT OFFICE.

SAMUEL PEARN, OF NEW YORK, N. Y.

SHIP'S PUMP.

Specification of Letters Patent No. 13,622, dated October 2, 1855.

*To all whom it may concern:*

Be it known that I, SAMUEL PEARN, of the city, county, and State of New York, have invented certain new and useful Improvements in Pumps for Raising Water from the Holds of Ships and other Places, of which the following is a full, clear, and exact description, reference being had to the accompanying drawings, making part of this specification, in which—

Figure 1, is a side elevation with the outer casing removed; Fig. 2, a vertical section taken in a plane parallel with Fig. 1, and Fig. 3, a cross vertical section taken at the line A, a, of Fig. 2.

The same letters indicate like parts in all the figures.

The object of my invention is to avoid the use of valves with all their disadvantages and liability to clogging and derangement particularly when applied to ships where grain and other granular parts of a cargo get into the hold of the ship and finally to the pumps; and my said invention consists in so combining two series of conical pipes, each series consisting of any desired number of pipes superimposed one above another, and the two series being inclined in opposite directions from the middle, with the small ends of the pipes of each series inserted into the under side of the pipes of the other series at some place between the two ends, so that the water received in the larger end of the lower pipe of the first series will, when the apparatus is vibrated, run out of the smaller end thereof into the lower pipe of the second series, and on the return motion, from this into the second pipe of the first series, and so on until discharged at top, there being sufficient space in each pipe around the end of the pipe inserted therein that the water may pass freely around it, and the projection of the pipe within it being sufficient to prevent the water from running back on the return motion.

In the accompanying drawings $a$, $a'$ represent two series of conical pipes, with the several pipes of each series arranged with the larger end outward from the other series and in succession one above the other. The two series are connected so that the upper surface of all the pipes in each series will be parallel, and the two series inclined in opposite directions with the small end of each of the pipes of each series inserted in, and fitted to a hole in the under part of the pipes of the other series about the middle of their length as at $b$, $b'$ the inserted ends projecting some distance inside of the bore thereof. As the pipes are conical and the ends of the pipes of one series inserted about the middle of the length of the pipes of the other series a passage will be left all around the inserted ends as at $c$, $c'$ for the passage of water. The outer and larger end of all the pipes, except the lower one of the series $a$, is closed, and that lower one is open, as also the small end of all of them. In this way a free open passage for water is formed from the bottom to the top, so that water will enter at the larger open end of the lowest pipe of the series $a$ and by vibrating the whole apparatus in the position represented by Fig. 1, the water will be discharged into the lowest pipe of the series $a'$ and when the apparatus is vibrated to the opposite direction, represented by Fig. 2, the water will be discharged from the lowest pipe of the series $a'$ into the second pipe of the series $a$ and so from one to the other until it is discharged at top into any suitable conduit. The water in being discharged from the large end toward and out of the small end of each pipe passes through the passages $c$, $c'$ around the small end of the pipe below of the other series which projects within it to a sufficient distance to prevent the water from running back. In this way by the vibrating movement of the apparatus alternately in opposite directions to an extent sufficient only to enable the water by gravity to run alternately from the pipe of one series to the pipe next above of the other series, the water is elevated and discharged above without the use of valves or other means for alternately opening and closing apertures. The passages for the water being at all times open, mud, sand, grain and all other granular matter, which on board ships and in other localities is liable to find its way to the reservoir from which water is to be raised, and which is so liable to clog and often to destroy the action of pumps, will pass through these passages, and will be as freely discharged as the water itself.

For discharging water from vessels I prefer to double the apparatus as represented in Fig. 3, reversing the series of pipes that the two may receive and discharge the water in opposite directions. The series of pipes are inclosed in a casing $d$ provided at bottom with a central pivot $e$ and circular platform $f$ with rollers $g$ fitted to the bottom or floor of the vessel to admit of turning the apparatus fore and aft, or athwart ship, so that the required vibratory motion for raising and discharging the water may be given by the motion of the vessel, or the casing may be provided with trunnions or journals $h$, $h$ on each side resting in boxes $i$, $i$ on which the whole apparatus will vibrate that the required motion may be given by hand or by any other motor. For ship use the boxes $i$, $i$ should be made to slide vertically and provided by suitable means for raising them so that in calms, or when the motion of the vessel is not sufficient, the apparatus may be raised from the floor of the vessel to a sufficient height to admit of working it by hand, and although I have described the mode of applying my said improved pump to a vessel and indicated some modifications in the mode of application contemplated by me, I wish it to be distinctly understood that I do not limit myself thereto as the mode of mounting the said pump and of imparting motion thereto may be varied at pleasure.

What I claim as my invention and desire to secure by Letters Patent is—

The combination of the two series of oppositely inclined conical pipes, when the small ends of the pipes of one series are inserted and project within the body of the pipes of the other series, and vice versa with sufficient space around the inserted ends for the return of the water, as the apparatus is vibrated alternately in opposite directions substantially as and for the purpose specified.

SAMUEL PEARN.

Witnesses:
WM. H. BISHOP,
ANDREW DE LACY.